United States Patent [19]

Pintsov

[11] Patent Number: 4,817,042

[45] Date of Patent: Mar. 28, 1989

[54] INSERTION MACHINE WITH PRIORITIZED SELECTION OF INSERTS

[75] Inventor: Leon A. Pintsov, West Hartford, Conn.

[73] Assignee: Pitney Bowes Inc., Stamford, Conn.

[21] Appl. No.: 205,584

[22] Filed: Jun. 6, 1988

Related U.S. Application Data

[63] Continuation of Ser. No. 890,677, Jul. 30, 1986, abandoned.

[51] Int. Cl.⁴ .................... B65H 41/00; G06F 15/20
[52] U.S. Cl. ................................... 364/478; 364/468
[58] Field of Search ............... 364/468, 469, 478, 479, 364/466, 567; 177/70, 25.15, 25.18; 53/500, 501, 502; 270/58; 209/900

[56] References Cited

U.S. PATENT DOCUMENTS

| | | | |
|---|---|---|---|
| 4,136,504 | 1/1979 | Wyslotsky | 53/502 |
| 4,368,790 | 1/1983 | Ives | 364/567 |
| 4,428,179 | 1/1984 | Jordan | 53/502 |
| 4,527,791 | 7/1985 | Pietroski | 270/58 |
| 4,549,278 | 10/1985 | Minamida | 364/567 |
| 4,549,617 | 10/1985 | Matsumoto | 177/25.18 |
| 4,550,792 | 11/1985 | Mosher | 364/567 |
| 4,579,925 | 2/1986 | Adams | 53/502 |
| 4,639,873 | 1/1987 | Baggarly | 364/478 |
| 4,661,917 | 4/1987 | Haye | 177/25.18 |

*Primary Examiner*—Michael R. Fleming
*Attorney, Agent, or Firm*—Lawrence E. Sklar; David E. Pitchenik; Melvin J. Scolnick

[57] ABSTRACT

An inserting machine which optimizes the final weight of a mailpiece in order to realize the maximum value of a postage category is disclosed. Each of the enclosure types which may be inserted within the mailpiece is assigned a level of priority based on a postage category. In addition, each of the enclosure types is assigned a maximum per enclosure weight. A processing unit calculates an initial weight for the mailpiece due to those enclosures having a priority which indicates that they must be inserted within the mailpiece without reservation. The processing unit then selects other enclosure types for insertion within the mailpiece based upon the priority level of the enclosure type and the maximum weight of the enclosure such that the final weight of the mailpiece is substantially equal to a maximum allowable weight threshold for a given postage category. The level of priority of an enclosure can be entered into the system by a variety of means and can further be changed from one collation processed to the next "on the fly."

10 Claims, 3 Drawing Sheets

INSERTION MACHINE WITH PRIORITIZED SELECTION OF INSERTS

This application is a continuation of application Ser. No. 890,677, filed July 30, 1986, now abandoned.

BACKGROUND OF THE INVENTION

1. Field of the Invention

The present invention relates generally to inserting machines and, more particularly, pertains to an inserting machine capable of making an intelligent selection of enclosures based on postage and application specific requirements.

2. Description of the Prior Art

Multistation insertion machines are widely utilized for mailing applications wherein a plurality of different types of enclosures, such as advertising enclosures or enclosures of general or limited interest, are to be included with a customer's monthly statement. Examples of such applications are monthly statements mailed by utilities, credit card companies, and banking or other financial institutions. Included, typically, with the statement are one or more enclosures, or inserts, which may convey a message to the companies customers, such as an offer of additional services, or of a change in company policy, or advertisements provided by third parties for inclusion within the companies monthly mailing.

Illustrative of such inserting machines are a U.S. Pat. No. 3,935,429, issued Jan. 27, 1976 to George N. Branecky and Gary R. Sochrim, and a U.S. Pat. No. 4,077,181, issued Mar. 7, 1978 to Leslie K. Asher, Charles E. Gibson, and Frank T. Roetter, each of the aforementioned Patents being assigned to the assignee of the present Application. Also illustrative of such an inserting machine is a copending application Ser. No.: 861,686, Filed: May 9, 1986, Titled: DOCUMENT COLLATING AND INSERTING SYSTEM HAVING DISPLAYS FOR DOCUMENT COUNT VERIFICATION, to Harry Luperti and Robert Irvine.

Although well suited for their intended applications, these and other known insertion machines of the prior art perform their insertion function in accordance with a scheme which is fixed for each piece of mail processed. That is, in addition to the required statement and other required documents which must be inserted, such as paid bank checks, these machines insert either a fixed or a prespecified number of enclosures.

In such a fixed insertion machine, a plurality of insert feeders disposed along a document insertion track are activated for each machine cycle, thereby feeding an enclosure for each piece of mail processed. Other types of machines are operable for reading an indicia provided on a control document, the indicia specifying, among other information, which of a plurality of inserts are to be fed for inclusion with the associated statement.

As many be appreciated, such systems do not provide a means for optimizing the number or type of included enclosures as to such criteria as weight, and hence postage cost, and other factors. Inasmuch as the reduction of postal mailing costs is often an important goal of the users of insertion systems, the systems of the prior art may not be suitable for such applications where the optimization of enclosure selection and reduced postal mailing costs are important goals.

In an attempt to achieve this goal of reducing postal costs, it has been known in the prior art to provide an inserting machine wherein the per item weight of the inserts held at a plurality of feeding stations is stored in a data processing memory. A processing means, using the stored per item weights, thereby calculates a total weight based on the number of inserts selectively fed from the feeding stations. This calculated weight is then utilized to determine which one of a plurality of postage meters, each being set to apply postage relating to a different weight category, will be subsequently activated to apply postage to the envelope. Such a system is disclosed in U.S. Pat. No. 4,561,925, issued on Feb. 25, 1986 to Jerryl Adams.

A problem may, however, be created in the use of such a system in that the per item weight entered for a particular insert may be an average weight for such an insert. As is well known, there is associated with the individual members of any group of similar items, such as advertising inserts of bank checks, a range of weights depending on the tolerances associated with the physical characteristics of these items. Differences in dimensions or the type of paper stock utilized, which differences may vary from lot to lot, will affect the actual weight of each item. In addition, environmental factors such as humidity will affect the weight of a document. Thus, the per item weight entered may be an average weight and may not reflect the actual weight to the item, thereby resulting in the calculated weight being in error. Such an error may result in the application of an excessive amount of postage to some envelopes or an insufficient amount of postage to others. In the case of the application of insufficient postage, additional costs may be incurred in reprocessing such mail in order to apply the correct postage amount.

Furthermore, the use of such a system does not address the significant problems of optimizing the number of the included inserts in order to achieve the full benefit of the postage category into which the envelope falls. Neither does such a system address the problem of the selection of enclosures for insertion based on criteria other than weight.

It has been known in the past to provide apparatus to optimize the final weight of a plurality of items such that the final weight is substantially equal to a desired final weight. However, such apparatus generally do not take into consideration any criteria except weight. For example, in the U.S. Pat. No. 4,428,179, issued Jan. 31, 1984 to C. Wane Jordan and John W. Walker, there is disclosed a device for filling a package with a predetermined weight of items, such as pieces of chicken. The device, under the control of a computer, determines which of several pieces of chicken held in a plurality of holding bins should be added to a partially filled package of chicken in order to bring the final weight of that package up to the predetermined final weight. In order to determine which one or ones of the pieces of chicken should be added, each holding bin is provided with a weighing means to determine the individual weight of each such piece of chicken so held. Thus, the piece or pieces which will most closely approach the desired final weight are selected for inclusion within the package.

Other U.S. Patents which describe means to arrive at a predetermined final weight when packaging items, such as cookies or bacon, are Nos. 4,545,179, 4,209,960, 4,141,442, 4,136,504, and 4,065,911.

In these U.S. Patents set forth above the sole criteria for including an item within the package is item weight, the individual items being, in general, of a fungible nature.

It is therefore an objective of the present invention to provide an insertion machine capable of intelligent selection of one or more enclosures from a plurality of various enclosure types. The selection being based on postage and other application specific requirements, such as the significance or priority of an enclosure relative to a particular customer.

It is a further objective of the present invention to provide an insertion machine capable of intelligent selection of one or more enclosures for insertion within an envelope whereby the total, final weight of the mailpiece is optimized to realize the full value of a postage category.

It is a further object of the present invention to provide an insertion machine which utilizes the maximum weight tolerance for each enclosure in order to calculate a true total weight for a mail piece.

SUMMARY OF THE INVENTION

The aforementioned problems of the prior art are overcome and the objects of the invention are achieved by an inserting machine providing for the intelligent selection of enclosures, or inserts, based upon a maximum weight of each enclosure and an application definition.

In an illustrative embodiment an inserting machine has a plurality of document feeders disposed along a transport deck for selectively feeding a bank statement, customer checks, and other enclosures thereto. A plurality of document pushers attached to an endless loop conveying chain are operable for collating the documents so fed and conveying them to an envelope inserting and sealing-machine, from which the sealed envelope is conveyed to a printing device, such as a postage meter, to have the appropriate postage applied.

In accordance with the invention, a processing means is provided for selectively activating the document feeders, and especially the enclosure feeders, to feed enclosures based upon maximum enclosure weight and a specific application definition. Such an insertion machine is operable for maximizing the number and type of enclosures fed such that the final weight of the stuffed envelope is optimized to realize the full value of a postage category into which the stuffed envelope falls. Such an insertion machine is further operable to drive an electronically programmable postage meter or other means of postage application, such as a manifest type of device, to apply the correct value of postage to each stuffed envelope, thereby eliminating the requirement of the prior art insertion machines to provide multiple postage meters.

Such an insertion machine is further operable for selecting an insert for insertion within an envelope based on a predefined level of significance, or priority, associated with the insert, as well as upon the maximum weight of the insert. The levels of significance may further be varied "on the fly," that is, the levels may be varied based on parameters related to a particular mailpiece such as the number of checks enclosed, other account types which the customer maintains or even by address or zip code.

BRIEF DESCRIPTION OF THE DRAWINGS

The above mentioned and other features of the invention will become better understood with reference to the following detailed description when taken in conjunction with the accompanying drawing, and in which.

DETAILED DESCRIPTION OF THE INVENTION

Figure 1:
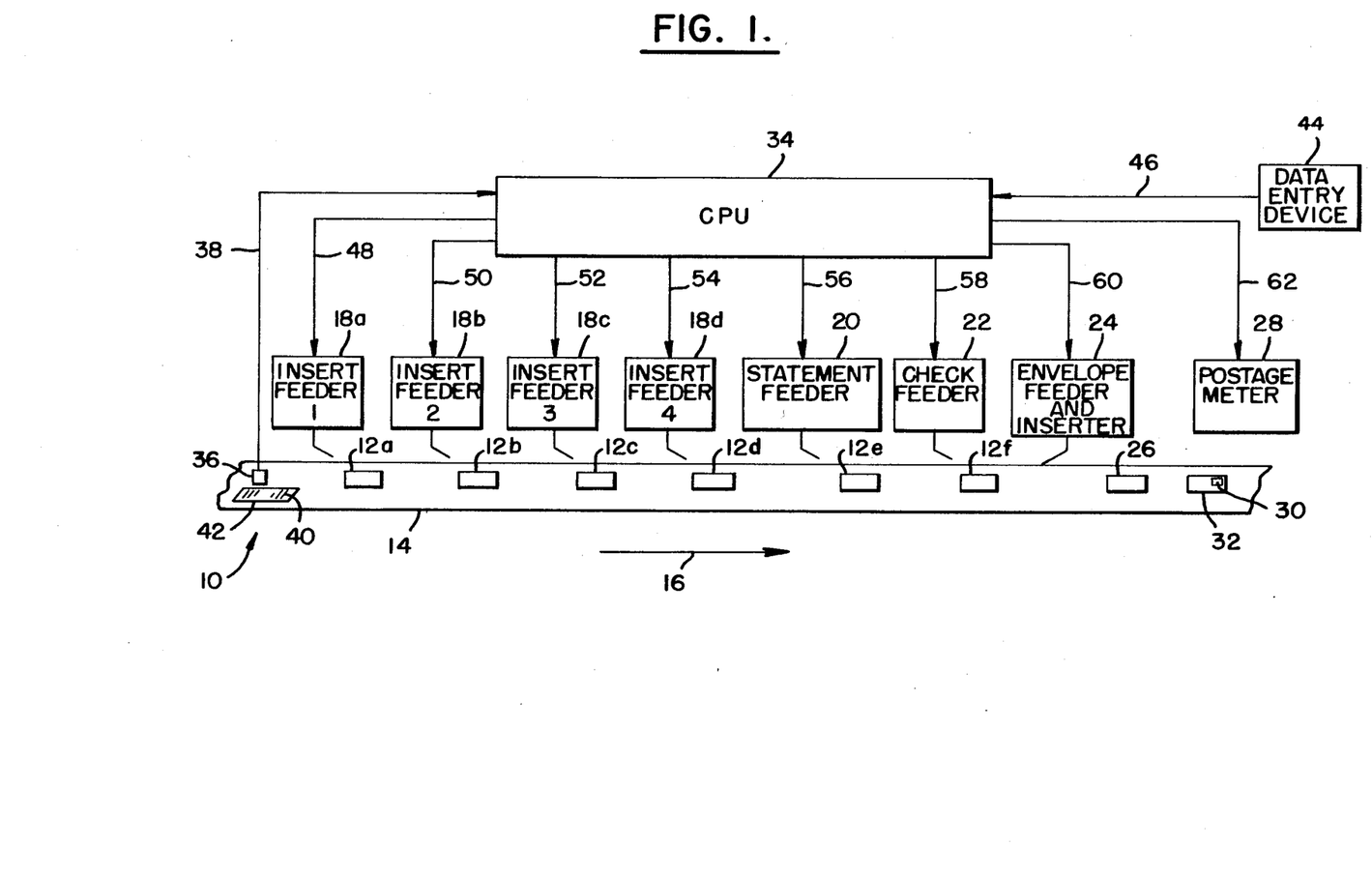
FIG. 1 is a block diagram of an electronic postal mailing system having one embodiment of the invention.

Referring now to FIG. 1 there is shown a portion of a multistation inserting system 10 having an embodiment of the invention. Although the system 10 as shown in FIG. 1 is adapted for use in a banking application, it should be realized that this is an illustrative embodiment only, and that the method of the invention is well suited for use with a variety of different inserting systems including, but not limited to, billing systems and systems adapted for the mass mailing of advertising literature and the like. The system is also usable outside of the mailing field in any application wherein the topping off of a final weight is desired and selectable insertions have different priorities.

In general, system 10 operates to feed documents from a plurality of document feeders onto a transport deck, the documents being conveyed down the deck to an envelope feeder and insertion station where the collated documents are inserted within an envelope. Thereafter the envelope is sealed and conveyed to a postage meter where a correct amount of postage is applied. The system, in this illustrative embodiment, is operable for reading an indicia provided on a control document which is also conveyed upon the deck, the indicia being indicative, among other things, of which inserts from a plurality of insert stations are to be included within a particular envelope. Controlling the operation of the document feeders in response to the indicia is a system processing unit. The processing unit is also operable for determining the correct amount of postage for each stuffed envelope and for providing by a suitable communications means the postage information to the postage meter. The meter is comprised of a printer, such as an ink jet printer, operable for printing a postmark or postage indicia indicative of differing postage amounts upon each successive stuffed envelope depending upon the weight of the stuffed envelope. Such an indicia may take the form of a graphical pattern or a bar code or some other type of approved pattern for representing the dollar amount of the postage and other information, such as a level of presort or a level of significance (or priority), etc.

As may be seen more specifically in FIG. 1 a plurality of document collations 12a through 12f are disposed upon the surface of a transport deck 14 and are transported thereon in a direction indicated by the arrow 16. The collations 12 may be transported by a plurality of document pushers (not shown) which extend upwards through the deck 14, the pushers being attached to an endless loop conveying chain (not shown) disposed beneath deck 14. Each of the collations 12a through 12f may be comprised of a different number of documents and document types, the document types being inserts fed from a plurality of insert feeders 18, a statement fed from feeder 20, and bank checks fed from check feeder 22. As may be appreciated, collation 12a will generally be comprised of one or more inserts fed from feeder 18a, while collation 12b may be comprised of two or more inserts fed from feeder 18a and feeder 18b. Collation 12c may be comprised of three or more inserts, and so on.

Collation 12f, also referred to herein as a final collation, is comprised of a bank statement fed from feeder 20 and some variable number of checks fed from feeder 22. In addition, collation 12f may be comprised of one or more inserts fed from feeders 18a through 18d. Final collation 12f is transported to an envelope feeder and inserter 24, where it is inserted, or stuffed, within an envelope. The operation of inserter 24 subsequently seals the stuffed envelope 26 which is thereafter conveyed to a postage printing device such as postage meter 28 to have a postage indicia 30 applied thereto. The postage metered envelope 32 will thereafter be transported to other, unillustrated portions of the system 10 where it may be sorted according to zip code and stacked for mailing.

Control of the operation of system 10 is provided by a control unit, which may be comprised of a central processing unit (CPU) 34. CPU 34, which may be a microcomputer, has a plurality of inputs and outputs (only some of which are shown in FIG. 1) for inputting document related data and for controlling the various document feeders, the inserter and the postage meter.

As may be seen in FIG. 1, there is connected to CPU 34, in this embodiment of the invention, a photosensor 36 having an output 38. Photosensor 36 is disposed relative to deck 14 such that it may sense an indicia 40 provided on a control document 42, the indicia being read by CPU 34 via output 38. Typically, one such control document 42 is provided for each customer mailpiece, the indicia 40 being indicative of, for example, the number of returned checks to be fed by feeder 22, which ones of the inserts contained in feeders 18a through 18d are to be included within the mailpiece and additionally, enclosure significance data. As may be appreciated, in other embodiments of the invention such information may be provided to CPU 34 in a variety of different ways, such as by a direct communications link to a central electronic data processing (EDP) computer.

Also connected as an input to CPU 34 is a data entry device 44, the device 44 being connected via a suitable cable 46. The data entry device 44, which may be an operator actuated keyboard or a separate EDP system, functions, in accordance with the invention, to enter enclosure significance data and a representation of enclosure maximum weight data into CPU 34. The purpose and method of using this data will be discussed hereinafter.

In addition to the above described inputs, CPU 34 has a plurality of output lines 48 through 62 suitable for controlling the activation of the insert feeders 18, the statement feeder 20, the check feeder 22, the inserter 24 and the storage meter 28. For example, line 62 may be a serial data communications link operable for transmitting information expressive of a required value of postage to be applied by meter 28.

It should be realized that an insertion system of the type described above is operable for processing a plurality of individual mailpieces in a high speed and continous manner.

Of particular interest to the instant invention is the activation by CPU 34 of the insert feeders 18. As has been previously mentioned, in some systems of the prior art all of the feeders 18 would be activated for every customer mailpiece. Thus, no selectivity as to which inserts a particular customer would receive was provided.

In other systems of the prior art which do provide for some selectivity as to insert selection, the selection of inserts would be predetermined and provided to the system, typically, on the control doucument. In such a system only the feeders for the selected inserts would be activated during the collation of a mailpiece.

As may be appreciated, neither of the above mentioned types of systems of the prior art have the capability to modify the inserts selected during the actual processing of a particular mailpiece. Because of this deficiency the systems of the prior art also do not have the capability to optimize the final weight of the mailpiece in order to obtain the full value of a postage category.

Referring now to the flow charts of FIGS. 2 and 3, there will be described a method of providing an inserting machine with the necessary decision making capability to make an intelligent determination as to which enclosures to include within a particular mailpiece, the determination being based on an application definition.

In general, an application definition can be considered as a set of enclosures ($E_1, E_2 \ldots E_N$) the set being comprised of an enclosure $E_1$ to be fed from a feeder 1, and so on. The total number of potential enclosures, represented by N, includes the carrier, or mailing envelope. In this embodiment of the invention there are two attributes associated with each enclosure, namely a level of significance (S), or priority, and a postage influencing characteristic, which in this embodiment is a maximum weight (W).

For example, the existing postal rate system is based on twelve weight categories of 0.00 to 12.00 ounces. In inserting applications all weights over three ounces are considered as one category, therefore there are four weight categories of interest for this embodiment of the invention. The categories of interest are 0.00 to 0.99 ounces, 1.00 to 1.99 ounces, 2.00 to 2.99 ounces and 3.00 ounces or greater. For the purposes of this discussiion 3.00 ounces will be assigned the weight threshold $t_3$, two ounces will be assigned the weight threshold $t_2$, and one ounce the weight threshold $t_1$, each such threshold being indicative of the point at which a different postage amount is required.

Based on the above described postal rate categorization, the levels of significance may be defined as follows:
(a) S=A when an enclosure must be inserted without reservation as to the total final weight of the mailpiece,
(b) S=B when an enclosure should be inserted only if the total final weight of the mailpiece, including this enclosure, will not exceed $t_3$,
(c) S=C when an enclosure should be inserted only if the total final weight of the mailpiece, including this enclosure, will not exceed $t_2$, and
(d) S=D when an enclosure should be inserted only if the total final weight of the mailpiece, including this enclosure, will not exceed $t_1$.

It should be realized, however, that the number of levels of significance is not limited to four, in that a different postal rate categorization or other factors may result in more or less than four levels of significance being utilized for a particular application.

It should further be realized that the assignment of particular level of significance to an enclosure may be based on a variety of application specific factors. For example, a particular enclosure may be assigned a significance level of D for certain of the bank's customers and a level of B or C for certain other of the bank's customers. The differentiation between customers may be made in a variety of manners, such as by other types of banking accounts maintained by the customers, or the average minimum balance maintained within such an account, or even by geographical location, such as indicated by the customer's zip code. For example, an enclosure describing a new type of money market account to be offered by the bank may be considered to be of more significance to those of the bank's customers who already maintain money market accounts than to those of the bank's customers who only maintain a checking account. Therefore, such an enclosure may be assigned a relatively high significance level of A or B for some customers and a relatively low significance level of D for certain other of the bank's customers. As may be appreciated, such customer related information may be provided to the CPU 34 by the control document 42 or by any of a variety of suitable means. Thus, the level of significance of a particular enclosure may be dynamically varied from one mailpiece processed to the next. In other words, the significance data entered via data entry device 44 may be modified by information contained on the control document 42. Thus the significance or priority of a document may be altered "on the fly."

Inasmuch as the levels of significance are based on maximum weight thresholds, the levels are thereby also based on an amount of postage. An enclosure assigned to significance level C will be deemed to have a higher priority than an enclosure assigned to a level of D since the dollar amount of postage associated with weight threshold $t_2$ is greater than that assigned to weight threshold $t_1$.

In accordance with the levels of significance described above, certain enclosures will by definition be considered level A enclosures. In the banking insertion machine of the illustrative embodiment, the bank statement, returned customer checks, and the carrier envelope itself must all by necessity be included without reservation as to the final weight of the mailpiece. Additionally, one or more of the inserts held in feeders 18a through 18d may convey important information applicable to all checking account customers. As an example, such an insert may give notification of a change in checking account fees. Such an insert may be considered to be of such general importance that it is assigned to a significance level of A, thereby being included with each mailpiece without regard for the total final weight and hence the postage cost of the mailpiece.

Others inserts held in feeders 18a through 18d may be considered to be of more limited interest, and hence are not required to be included in every mailpiece without reservation as to postage cost. These various insert types would therefore be assigned to the remaining significance levels, namely B, C or D.

As has been previously mentioned, the second attribute of the two attributes associated with each enclosure is the maximum weight of the enclosure. More specifically, the second attribute is the maximum possible weight based on the maximum possible deviation from the average weight. For example, if the average weight of a check is assumed to be 0.1 ounce, ten such checks may be assumed to weigh 1.0 ounce. If, however, the possible deviation, or weight tolerance, of each check is 0.01 ounces, ten such checks could weigh in the range of 0.9 to 1.1 ounce. Ten such checks included with a statement, carrier envelope, and inserts may result in the final mailpiece weighing in excess of say, two ounces, when the calculated weight of the mailpiece, based on the average weight, is calculated to be less than two ounces. Thus, the mailpiece may be metered with an insufficient amount of postage, thereby creating the possibility that additional costs will be incurred in reprocessing such incorrectly metered mail.

In order to overcome this problem the use of the invention provides for utilizing the maximum possible weight of each enclosure during the calculations which will be described more fully hereinafter. The maximum possible weight may be entered directly via the data entry device 44, or an average or nominal weight may be entered along with the maximum possible deviation from the nominal weight. If the latter type of data entry is utilized, CPU 34 will compute the maximum possible weight of each particular enclosure.

In addition, the significance level of each enclosure, namely A, B, C or D, is entered via device 44. Such data entry may be accomplished in a variety of ways, such as by an operator keypad or by a separate data processing computer. Yet another way to enter such significance data is to assign the levels to predefined document feeders.

Figure 2:
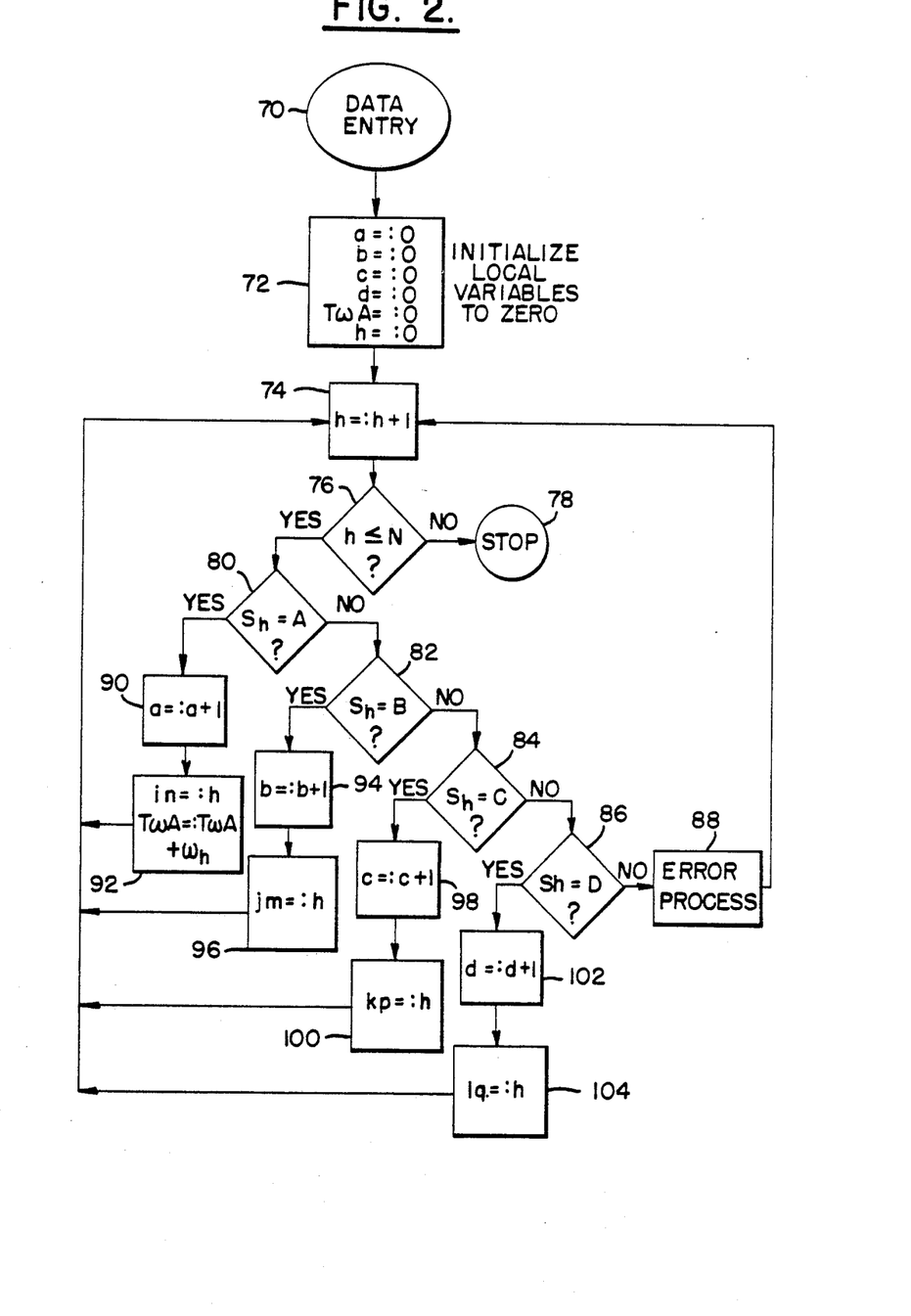
FIG. 2 is a flow chart depicting an enclosure sorting procedure in accordance with the invention.
Figure 3:
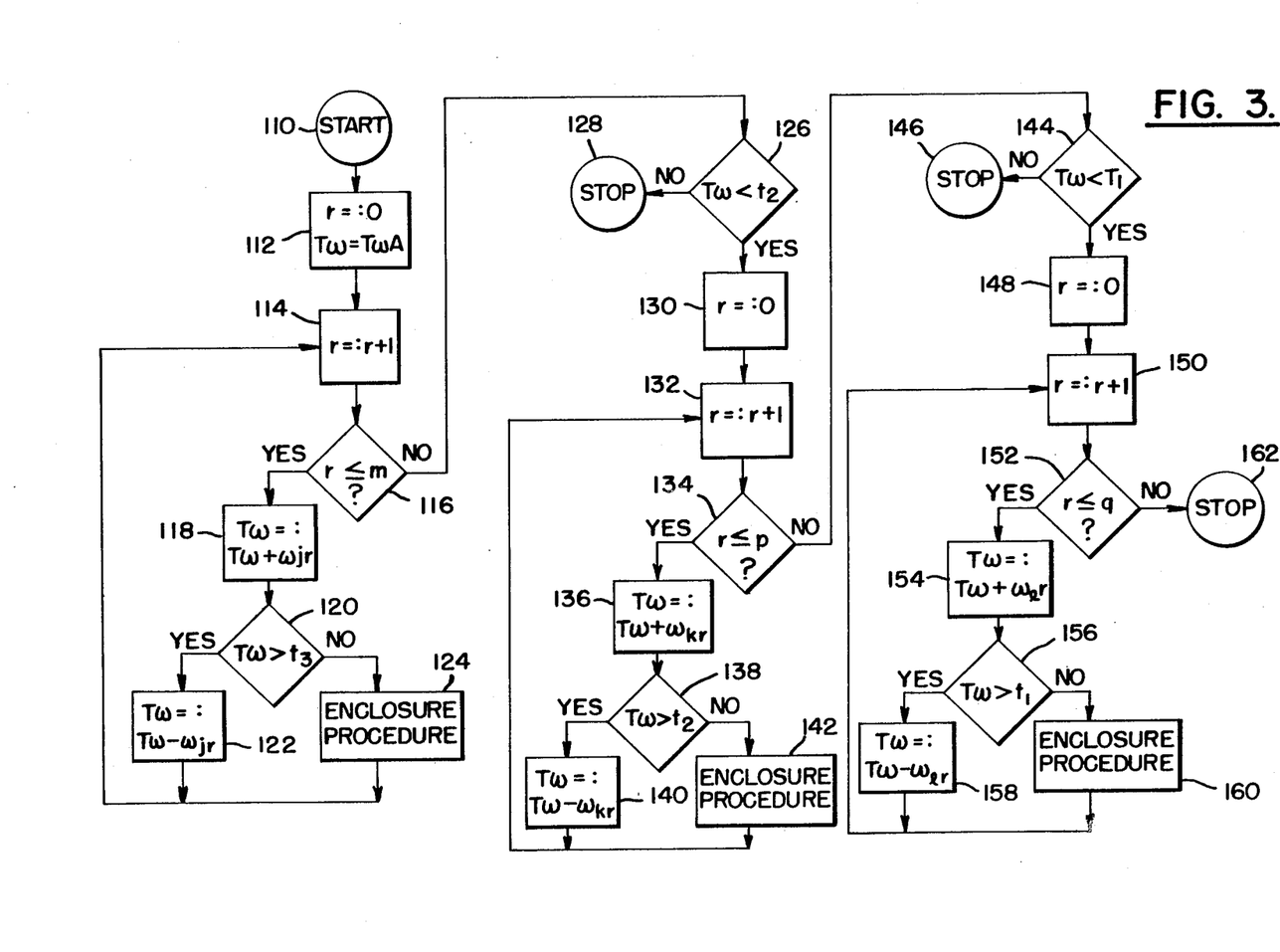
FIG. 3 is a flow chart depicting an enclosure selection procedure in accordance with the invention.

The method of the invention is substantially accomplished through the use of a sorting and a selecting procedure as illustrated in the flow charts of FIGS. 2 and 3. It should be realized however, that the procedures as illustrated in FIGS. 2 and 3 are representative only and that a possibly large number of alternative sorting and selecting procedures may be devised by those skilled in the art. Hence, the method of the invention should not be considered to be limited to the procedures depicted in the flowcharts of FIGS. 2 and 3.

Referring now to FIG. 2, a first procedure is shown wherein all potential enclosures (E) are sorted into four groups, namely:

(a) $E_{i1}, E_{i2}, \ldots E_{in}$;
(b) $E_{j1}, E_{j2}, \ldots E_{jm}$;
(c) $E_{k1}, E_{k2}, \ldots E_{kp}$; and
(d) $E_{l1}, E_{l2}, \ldots E_{lq}$.

These groups are representative of enclosuresof Class A, Class B, Class C and Class D, respectively.

For each mailpiece processed there is entered the significance (S) and the maximum weight (W) of each enclosure, block 70. As has been previously mentioned, such data may be entered by an operator actuated keyboard or some other suitable manner. The total number of entries so made is assigned the value N. After the step of data entry, all variable parameters and the total weight of all Class A enclosures are initialized to zero, block 72. Thereafter, a counter value, represented by h, is incremented by one, block 74, and at block 76 the value of h is compared to N. If h is greater than N, N being the total number of enclosure entries made at block 70, then the enclosure sorting method of FIG. 2 is halted at block 78.

If h is equal to or less than N, the method next determines at block 80 if the value of S associated with this enclosure indicates that the enclosure is a Class A enclosure. If S is not equal to A, another comparison is made at block 82 to determine is S is equal to B. If S is not equal to B, S is compared to C at block 84. If S is not equal to C, one further comparison is made at block 86 to determine if S is equal to D. In the event that an error occurred during the data entry procedure of block 70 such that the significance if an enclosure does not correspond to any of the four recognized significance levels A, B, C or D, a suitable error process is performed at block 88 after which the program returns to block 74 in order to process the next enclosure.

Referring once more to block 80, if the significance of an enclosure is determined to be of level A, a counter having a value of (a) is incremented by one at block 90, thereby maintaining a count of the total number of Class A enclosures. Next, at block 92, the position of the enclosure within the list of enclosures is assigned according to the current value of h. As an example, if the seventh enclosure being processed is also the third Class A enclosure processed then $E_{ia}$ would equal $E_{73}$, which enclosure would be identified as seventh on the list of entered enclosures. In addition, at block 92 the total weight of the Class A enclosures would be increased by the maximum weight of the current enclosure, such that at the completion of the sorting process, block 78, the maximum total weight of all Class A enclosures (TWA) for the mailpiece is known. Thereafter the program reenters block 74 in order to process the next enclosure on the list of entered enclosures.

If an enclosure is determined, at block 82, to be a Class B enclosure the Class B counter (b) is incremented by one at block 94. At block 96 the value of h is assigned to jm, which value then is indicative of the position of this enclosure in the list of all enclosures of Class B. The program next reverts to block 74 to process the next enclosure on the list. The operation of blocks 98 and 100, and 102 and 104, are similar for those enclosures identified as Class C and Class D enclosures, respectively.

At the completion of the sorting procedure as illustrated by FIG. 2, all potential enclosures will have been sorted into the aforementioned four categories. In addition, the maximum total weight of all Class A enclosures (TWA) will be known as will the number of enclosures within each category, as represented by the values assigned to n, m, p and q.

At the completion of the sorting procedure of FIG. 2 it is necessary to determine which of the inserts will be selected for insertion within a mailpiece. One goal of the selection procedure, it should be remembered, is to optimize the final weight of the mailpiece to realize the full value of a postal category.

Referring now to FIG. 3, there is shown a flow chart of this enclosure selection process. At Block 110 the selection procedure is started. At this time all those enclosures indentified as Class A enclosures will have already been selected for inclusion within the mailpiece, it being recalled that Class A enclosures are inserted without regard to the final weight of the mailpiece. In the instant example, the bank statement, cancelled checks, carrier envelope and, possibly, certain ones of the inserts will thus already be designated for insertion within the mailpiece.

At block 112 a counter designated as r is reset to zero and a variable which is representative of the total weight (TW) of the mailpiece is assigned the value TWA, TWA having been calculated at block 92 in the flow chart of FIG. 2 to be the maximum total weight of all Class A enclosures.

At block 114 r is incremented and at block 116 compared to the total number, represented by m, of all Class B enclosures. If r is less than or equal to m then there still remains at least one Class B enclosure within the list of B enclosures. If r is greater than m, then all of the class B enclosures have been tested for inclusion within the mailpiece and processing continues for the Class C enclosures.

If there are remaining Class B enclosures processing continues to block 118 where the maximum weight of the currrent Class B enclosure (Wjr) is added to the current total weight (TW) of the mailpiece. At block 120 this tentative total weight is compared to threshold $t_3$, which in this example is 3.00 ounces. If the tentative total weight exceeds $t_3$ then processing continues to block 122, where the total weight is adjusted downwards by the weight to the Class B enclosure added at block 118. Since the inclusion of this particular Class B enclosure would exceed the threshold $t_3$, the enclosure is not selected for the inclusion and processing resumes at block 114. If the tentative total weight is determined, at block 120, to be less than thresholed $t_3$ then the enclosure is selected for inclusion at block 124, afterwhich processing continues at block 114. The enclosure procedure, shown as block 124, may involve including the document feeder which contains this enclosure within a list of feeders to be activated during the processing of this particular mailpiece.

Returning to block 116, when it is determined that all Class B enclosures have been examined for possible inclusion within the mailpiece a test is made at block 126 to determined if the maximum total weight (TW) of the mailpiece thus far is less than threshold $t_2$, or two ounces in this example. If TW is determined to be greater than $t_2$ the enclosure selection process is halted at block 128. At this time, the document feeders selected for activation may be energized and the mailpiece processed by the system 10.

If at block 126 it is determined that TW is less than $t_2$, then those enclosures belonging to Class C are sequentially tested to determine which, if any, may be included within the mailpiece without exceeding the weight threshold $t_2$. This testing procedure is indicated by blocks 132 through 142, which perform in a similar fashion to the blocks 114 to 124.

Referring to block 134, when it is determined that all of the Class C enclosures have been tested for possible inclusion within the mailpiece a further test is made at block 144 to determined if the TW of the mailpiece thus far is less than threshold $t_1$, or one ounce in this example. If TW is less than $t_1$, the list of Class D enclosures is sequentially tested to determined which, if any, of the Class D enclosures may be included within the mailpiece without exceeding the $t_1$ threshold. The Class D selection procedure is indicated by the blocks 148 through 160, which operate in a similar fashion to the blocks 130 through 142 and 112 through 124.

Referring to Block 152, when it is determined that all of the Class D enclosures have been tested for possible inclusion within the mailpiece, the selection process halts at block 162. As has been previously mentioned, at the completion of the enclosure selection process of FIG. 3, those enclosures selected will be included within the mailpiece by selectively activating their respective document feeders.

In accordance with the method and system of the invention as shown in FIGS. 2 and 3, it can be seen that a final mailpiece will be comprised of all Class A enclosures and, in addition, those Class B, C and D enclosures which do not exceed their respective maximum weight thresholds. Therefore, the method of the invention allows for optimizing the final weight or a mailpiece so as to realize the full value of a postage category. Such a weight optimization, or "topping off", procedure results in increased efficiency and financial savings.

For example, if the final total weight of a mailpiece containing Class A enclosures is 2.2 ounces, the mailpiece must be metered with an amount of postage corresponding to threshold $t_2$. The mailpiece may, however, contain an additional 0.79 ounces of weight without exceeding threshold $t_2$. Thus, the method of the invention allows for selecting one or more Class B enclosures for inclusion within the mailpiece in order to realize the full value of the postage required for threshold $t_2$.

It should be realized that the above described embodiment of the invention may be modified in a variety of ways and those modifications would still be within the spirit and scope of the Applicants' invention. For example, one such modification may be controlling the system by some other means than by the control document, such as by counting the checks as they are fed until a check divider document is encountered, as is well known in the art. As another example, the Class A enclosures may be fed, collated, and conveyed to a weighing station. The actual weight may then be compared to the various weight thresholds to determined which, if any, of the enclosures of Class B, C or D may be added to the collation to bring up the weight to the maximum allowable weight for a particular postage category. Thus, while this invention has been disclosed by means of a specific, illustrative embodiment, the principals thereof are capable of a wide range of modification by those skilled in the art with in the scope of the following claims.

What is claimed is:

1. A method of topping off the final weight of a mailpiece, the mailpiece being comprised of one or more enclosure types, such that the final weight is substantially equal to a maximum allowable weight threshold of a postage category, the category being indicative of a range of weight, the category further being indicative of a required value of postage, comprising the steps of:
   assigning to each of the enclosure types an attribute representative of at least a first or a second level of priority, the level or priority being based at least on a factor other than weight;
   assigning to each of the enclosure types an attribute representative of a per enclosure maximum possible weight;
   sorting the enclosure types into groups, each group being comprised of enclosure types having an identical priority level attribute assigned thereto whereby each group has the priority level attribute associated therewith;
   determining from the level of priority associated with each group which, if any, of the groups must be provided for the mailpiece without regard for the required value of postage;
   determining an initial maximum total weight of the mailpiece due to the per item maximum weight attribute of each of the enclosure types of a group which must be so provided whereby the mailpiece is assigned to a given postage category;
   determining the difference in weight, if any, between the initial maximum total weight of the mailpiece and a maximum allowable weight threshold of any desired postage category; and
   selecting individual enclosures to be provided for the mailpiece, the individual enclosures being selected from a group having a level of priority which is equal to or greater than the given postage category, the individual ones being selected such that the per enclosure maximum weight, when added to the initial maximum weight, yields a final maximum weight which is substantially equal to the maximum allowable weight threshold of the desired postage category.

2. A method of selectively determining relative to a value of postage which ones of a plurality of different enclosure types are to be provided by a mailing system for inclusion within a mailpiece, the system comprising a processing unit operable at least for having enclosure related data entered therein and also for selectively activating individual ones of a plurality of enclosure feeding stations for feeding individual ones of an enclosure type contained therein, the method comprising the steps of:
   entering data into the processing unit indicative of a level of significance relative to a value of postage associated with each of the enclosure types;
   entering data into the processing unit indicative of a maximum amount of a postage influencing characteristic associated with each of the enclosure types; and
   selecting individual ones of the plurality of enclosure types to be provided for inclusion within the mailpiece based upon a determination of the level of significance and the postage influencing characteristic associated with each enclosure type whereby a final postage influencing characteristic of the mailpiece is optimized such that substantially all of the value of an amount of postage required for the mailpiece is realized.

3. The method of claim 2 wherein the postage influencing characteristic is a maximum weight.

4. The method of claim 2 further comprising the step of selectively activating individual ones of the enclosure feeding stations, as determined by the step of selecting, to feed individual ones of the enclosure type contained therein for inclusion within the mailpiece.

5. A method of optimizing the final weight of a mailpiece being comprises of one or more enclosures such that substantially all of the value of a required postage amount is realized, comprising the steps of:
   assigning a level of significance relative to an amount of postage to each enclosure;
   determining the maximum weight of each enclosure; and
   selecting for inclusion within the mailpiece individual ones of the enclosure, the selecting being based on the level of significance and the maximum weight of each enclosure whereby the final weight of the mailpiece is made to be substantially equal to the maximum total weight allowed for the value of the required postage amount.

6. In a mailing system of the type having a processing unit operable for selectively activating individual ones of a plurality of enclosure feeding stations for feeding individual ones of an enclosure type contained therein for insertion within a mailpiece, said mailpiece subsequently being postmarked with an amount of postage determined by a postage influencing characteristic of said mailpiece, the improvement comprising:
   means for entering enclosure related data for a mailpiece into said processing unit, said data at least being indicative of a level of significance and of a maximum amount of a postage influencing characteristic associated with each of said enclosure types; and means for selecting individual ones of said enclosure feeding stations for activation, said means for selecting being responsive to said entered data for optimizing the postage influencing characteristic of said mailpiece whereby the full value of said amount of postage is realized.

7. The mailing system of claim 6 wherein said postage influencing characteristic is a maximum weight.

8. A method of selectively determining relative to a value of postage which ones of a plurality of different enclosure types are to be provided by a mailing system for inclusion within individual ones of a plurality of mailpieces, the system comprising a processing unit operable at least for having enclosure related data entered therein and also for selectively activating individual ones of a plurality of enclosure feeding stations for feeding individual ones of an enclosure type contained therein, the method comprising the steps of:
- (a) entering data into the processing unit indicative of a level of significance relative to a value of postage associated with each of the enclosure types;
- (b) entering data into the processing unit indicative of a maximum amount of a postage influencing characteristic associated with each of the enclosure types;
- (c) optionally entering additional data into the processing unit indicative of a level of significance modifying characteristic whereby the significance data entered at step (a) may be modified; and
- (d) selecting individual ones of the plurality of enclosure types to be provided for inclusion within the mailpiece based upon a determination of the level of significance or the modified level of significance and the postage influencing characteristic associated with each enclosure type whereby a final postage influencing characteristic of the mailpiece is optimized such that substantially all of the value of an amount of postage required for the mailpiece is realized.

9. The method of claim 8 wherein the postage influencing characteristic is a maximum weight.

10. The method of claim 9 further comprising the step of selectively activating individual ones of the enclosure feeding stations, as determined by the step of selecting, to feed individual ones of the enclosure type contained therein for inclusion within the mailpiece.

* * * * *

UNITED STATES PATENT AND TRADEMARK OFFICE
CERTIFICATE OF CORRECTION

PATENT NO. : 4,817,042

DATED : March 28, 1989

INVENTOR(S) : Leon A. Pintsov

It is certified that error appears in the above-identified patent and that said Letters Patent is hereby corrected as shown below:

Claim 2, column 12, line 19, "types;" should be -- types, said level of significance based on factors other than weight; --

Claim 5, column 12, line 45, "enclosure;" should be -- enclosure, said level of significance based on factors other than weight; --

Claim 6, column 12, line 68, "types;" should be -- types, said level of significance based on at least one factor other than weight; --

Claim 8, column 13, line 22, "types;" should be -- types, said level of significance based at least on one factor other than weight; --

Signed and Sealed this

Twelfth Day of January, 1993

Attest:

DOUGLAS B. COMER

*Attesting Officer*    Acting Commissioner of Patents and Trademarks